(12) United States Patent
Goldman et al.

(10) Patent No.: US 12,133,142 B2
(45) Date of Patent: *Oct. 29, 2024

(54) LOCATION DETECTION SYSTEMS AND METHODS OF USE

(71) Applicant: Konnect Solutions, Inc., San Jose, CA (US)

(72) Inventors: Austen D. Goldman, San Jose, CA (US); Nicholas Pappas, Rochester, NY (US); Daniel I. Orloff, San Jose, CA (US); Robert J. Goldman, San Jose, CA (US)

(73) Assignee: KONNECT SOLUTIONS, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/821,403

(22) Filed: Aug. 22, 2022

(65) Prior Publication Data

US 2023/0068152 A1 Mar. 2, 2023

Related U.S. Application Data

(63) Continuation of application No. 16/792,415, filed on Feb. 17, 2020, now Pat. No. 11,546,730, which is a
(Continued)

(51) Int. Cl.
*H04W 4/33* (2018.01)
*H04W 4/029* (2018.01)
(Continued)

(52) U.S. Cl.
CPC ............ *H04W 4/029* (2018.02); *H04W 4/33* (2018.02); *H04W 8/005* (2013.01); *H04W 8/26* (2013.01);
(Continued)

(58) Field of Classification Search
CPC ...................................... H04W 4/09
(Continued)

(56) References Cited

U.S. PATENT DOCUMENTS 8,219,493 B2 7/2012 Gupte
10,567,920 B1 2/2020 Goldman et al.
(Continued)

OTHER PUBLICATIONS

U.S. Appl. No. 14/295,179, filed Jun. 3, 2014, Location Detection Systems and Methods of Use.
(Continued)

*Primary Examiner* — Joseph Arevalo
(74) *Attorney, Agent, or Firm* — SCHWEGMAN LUNDBERG & WOESSNER, P.A.

(57) ABSTRACT

Systems and methods are provided for allowing a mobile device user's location and or identity to be determined. According to one aspect of the disclosure, a method of creating a database comprises providing a first wireless router at a point of sale where a credit card is used in a transaction by a credit card holder, obtaining an identity of the credit card holder during the credit card transaction, establishing a wireless link between the first router and a mobile device carried by the credit card holder, obtaining a Media Access Control (MAC) address associated with the credit card holder's mobile device over the wireless link, correlating the identity of the credit card holder with the MAC address of the credit card holder, and storing the correlated identity and MAC address on a server. In some embodiments, a cellular identifier is obtained rather than a MAC address.

17 Claims, 1 Drawing Sheet

Related U.S. Application Data continuation of application No. 15/174,328, filed on Jun. 6, 2016, now Pat. No. 10,567,920, which is a continuation of application No. 14/295,179, filed on Jun. 3, 2014, now abandoned.

(60) Provisional application No. 61/915,449, filed on Dec. 12, 2013, provisional application No. 61/831,111, filed on Jun. 4, 2013.

(51) Int. Cl.
| | | |
|---|---|---|
| *H04W 8/00* | (2009.01) | |
| *H04W 8/26* | (2009.01) | |
| *H04W 64/00* | (2009.01) | |
| *H04W 76/15* | (2018.01) | |
| *H04L 101/622* | (2022.01) | |
| *H04W 84/12* | (2009.01) | |

(52) U.S. Cl.
CPC .......... *H04W 64/00* (2013.01); *H04W 76/15* (2018.02); *H04L 2101/622* (2022.05); *H04W 84/12* (2013.01)

(58) Field of Classification Search
USPC ....... 370/338, 254, 238, 329, 330, 312, 235, 370/331, 350, 395.3, 229, 400
See application file for complete search history.

(56) References Cited

U.S. PATENT DOCUMENTS

| | | | |
|---|---|---|---|
| 11,546,730 | B1 | 1/2023 | Goldman et al. |
| 2003/0069071 | A1 | 4/2003 | Britt et al. |
| 2005/0181864 | A1 | 8/2005 | Britt et al. |
| 2005/0232186 | A1 | 10/2005 | Karaoguz et al. |
| 2005/0232242 | A1 | 10/2005 | Karaoguz et al. |
| 2005/0233744 | A1 | 10/2005 | Karaoguz et al. |
| 2006/0221933 | A1* | 10/2006 | Bauer .................. H04W 40/12 370/352 |
| 2007/0030824 | A1 | 2/2007 | Ribaudo et al. |
| 2007/0053306 | A1 | 3/2007 | Stevens |
| 2007/0055672 | A1 | 3/2007 | Stevens |
| 2007/0153739 | A1 | 7/2007 | Zheng |
| 2007/0178882 | A1 | 8/2007 | Teunissen et al. |
| 2009/0260064 | A1 | 10/2009 | Mcdowell et al. |
| 2010/0050249 | A1 | 2/2010 | Newman |
| 2010/0114723 | A1* | 5/2010 | Coppinger ........... G07G 1/0081 705/21 |
| 2010/0191584 | A1* | 7/2010 | Fraser .................. G07B 15/063 705/14.1 |
| 2011/0022517 | A1 | 1/2011 | Hammad |
| 2011/0066493 | A1 | 3/2011 | Faith et al. |
| 2011/0194541 | A1* | 8/2011 | Menaceur ............... H04L 45/48 370/338 |
| 2012/0046096 | A1 | 2/2012 | Morrison et al. |
| 2012/0051604 | A1* | 3/2012 | Dudovich ............. G06V 20/52 382/115 |
| 2012/0244885 | A1 | 9/2012 | Hefetz |
| 2012/0309371 | A1 | 12/2012 | Yamada |
| 2013/0095754 | A1* | 4/2013 | Moreton ............. G06Q 20/308 235/492 |
| 2013/0179344 | A1 | 7/2013 | Georgoulas et al. |
| 2013/0189953 | A1 | 7/2013 | Mathews |
| 2013/0190018 | A1 | 7/2013 | Mathews |
| 2013/0258997 | A1 | 10/2013 | Chen |
| 2013/0297422 | A1 | 11/2013 | Hunter et al. |
| 2014/0052553 | A1 | 2/2014 | Uzo |
| 2014/0122703 | A1 | 5/2014 | Pugh et al. |
| 2014/0137199 | A1 | 5/2014 | Hefetz |
| 2014/0278839 | A1 | 9/2014 | Lynam et al. |
| 2014/0279545 | A1 | 9/2014 | Enns et al. |
| 2014/0365304 | A1 | 12/2014 | Showers et al. |
| 2014/0370879 | A1* | 12/2014 | Redding ........... H04M 3/42178 455/419 |
| 2015/0019323 | A1 | 1/2015 | Goldberg et al. |
| 2015/0038120 | A1* | 2/2015 | Larkin ................. G06Q 20/326 455/411 |
| 2015/0332258 | A1 | 11/2015 | Kurabi et al. |
| 2015/0358819 | A1 | 12/2015 | Dipaola |
| 2016/0253645 | A1 | 9/2016 | Ciabarra et al. |
| 2018/0039975 | A1 | 2/2018 | Hefetz |
| 2018/0155057 | A1* | 6/2018 | Irish ..................... G08G 1/0175 |
| 2019/0205874 | A1 | 7/2019 | Hamid et al. |

OTHER PUBLICATIONS

U.S. Appl. No. 15/174,328 U.S. Pat. No. 10,567,920, filed Jun. 6, 2016, Location Detection Systems and Methods of Use.

U.S. Appl. No. 16/792,415 U.S. Pat. No. 11,546,730, filed Feb. 17, 2020, Location Detection Systems and Methods of Use.

"U.S. Appl. No. 14/295,179, Restriction Requirement mailed Feb. 10, 2015", 6 pgs.

"U.S. Appl. No. 14/295,179, Response filed May 9, 2015 to Restriction Requirement mailed Feb. 10, 2015", 2 pgs.

"U.S. Appl. No. 14/295,179, Non Final Office Action mailed May 26, 2015", 8 pgs.

"U.S. Appl. No. 14/295,179, Response filed Nov. 26, 2015 to Non Final Office Action mailed May 26, 2015", 13 pgs.

"U.S. Appl. No. 14/295,179, Final Office Action mailed Dec. 9, 2015", 13 pgs.

"U.S. Appl. No. 15/174,328, Restriction Requirement mailed Jun. 11, 2018", 6 pgs.

"U.S. Appl. No. 15/174,328, Response filed Sep. 2, 2018 to Restriction Requirement mailed Jun. 11, 2018", 2 pgs.

"U.S. Appl. No. 15/174,328, Examiner Interview Summary mailed Dec. 11, 2018", 3 pgs.

"U.S. Appl. No. 15/174,328, Non Final Office Action mailed Sep. 12, 2018", 10 pgs.

"U.S. Appl. No. 15/174,328, Response filed Dec. 18, 2018 to Non Final Office Action mailed Sep. 12, 2018", 13 pgs.

"U.S. Appl. No. 15/174,328, Examiner Interview Summary mailed Jul. 1, 2019", 3 pgs.

"U.S. Appl. No. 15/174,328, Final Office Action mailed Mar. 13, 2019", 14 pgs.

"U.S. Appl. No. 15/174,328, Response filed Jul. 6, 2019 to Final Office Action mailed Mar. 13, 2019", 14 pgs.

"U.S. Appl. No. 15/174,328, Notice of Allowance mailed Oct. 4, 2019", 8 pgs.

"U.S. Appl. No. 16/792,415, Non Final Office Action mailed May 31, 2022", 8 pages.

"U.S. Appl. No. 16/792,415, Response filed Jul. 21, 2022 to Non Final Office Action mailed May 31, 2022", 5 pgs.

"U.S. Appl. No. 16/792,415, Notice of Allowance mailed Aug. 23, 2022".

* cited by examiner

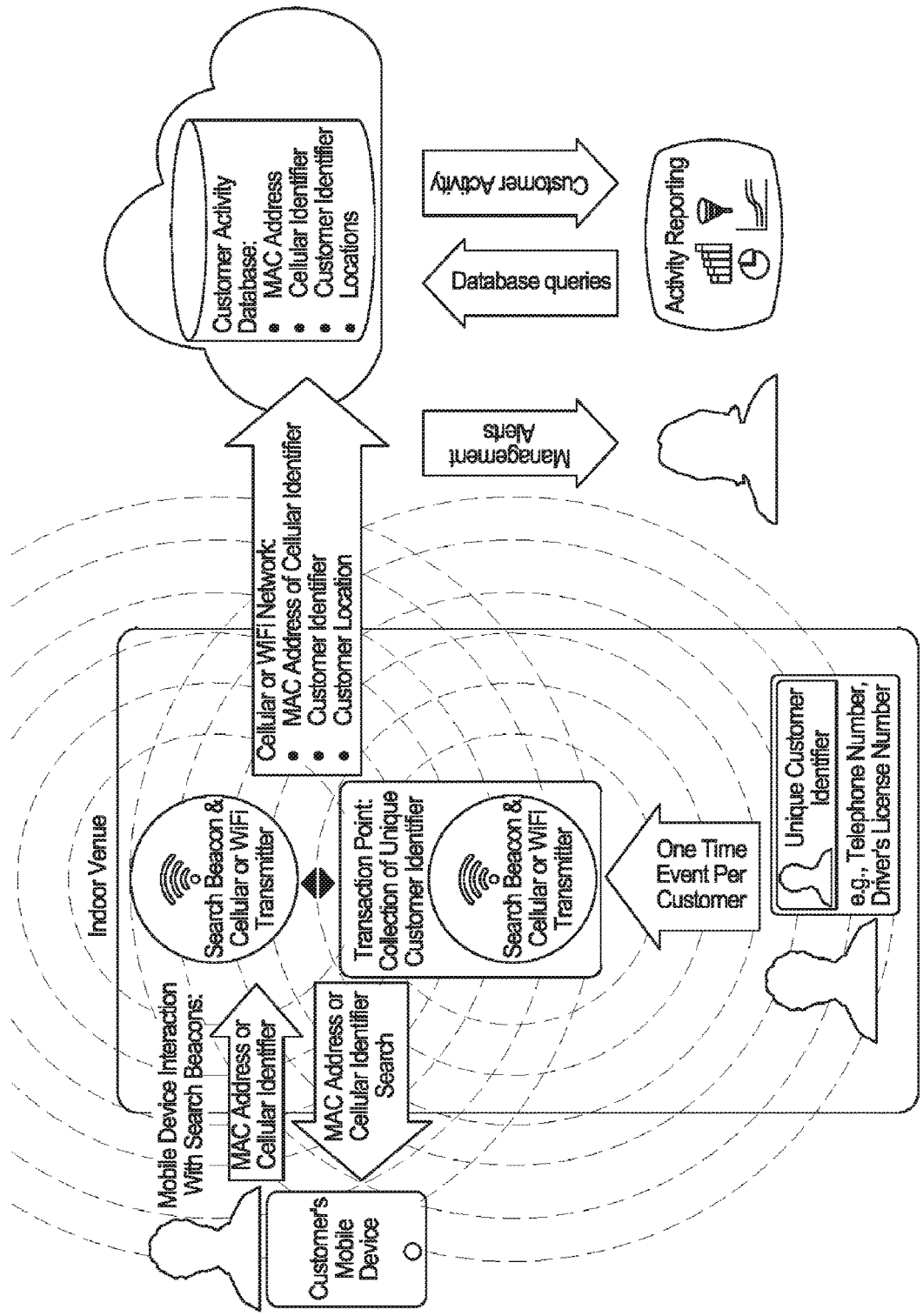

LOCATION DETECTION SYSTEMS AND METHODS OF USE

CROSS REFERENCE TO RELATED APPLICATIONS

This application is a continuation of U.S. patent application Ser. No. 15/174,328, "LOCATION DETECTION SYSTEMS AND METHODS OF USE", filed Jun. 6, 2016, now U.S. Pat. No. 10,567,920 issued Feb. 18, 2020; application Ser. No. 15/174,328 was a continuation of U.S. patent application Ser. No. 14/295,179, "LOCATION DETECTION SYSTEMS AND METHODS OF USE", filed Jun. 3, 2014; application Ser. No. 14/295,179 claims the priority benefit of U.S. provisional patent application 61/831,111 "LOCATION DETECTION SYSTEMS AND METHODS OF USE", filed Jun. 4, 2013; application Ser. No. 14/295, 179 also claims the priority benefit of U.S. provisional application 61/915,449, "LOCATION DETECTION SYSTEMS AND METHODS OF USE", filed Dec. 12, 2013; the entire contents of all of these applications are incorporated herein by reference.

FIELD OF THE INVENTION

This disclosure relates generally to locating the position of a person, such as in an indoor environment, and more particularly to locating the position by establishing a wireless and/or cellular link with a mobile device carried by the person.

BACKGROUND OF THE INVENTION

Various systems and methods exist for locating the position of a person by determining the location of a mobile device carried by the person, such as a mobile phone. The most commonly used position location systems employ a Global Positioning System (GPS) and/or triangulation using cellular phone towers. The location of the mobile phone can be displayed to the user, such as by showing the location on a map which is displayed on the mobile phone, can be used by a mobile phone application, such as by associating the current location with a photograph taken with a camera on the mobile phone, and/or can be transmitted over a cellular or wireless network to a remote location, such as a social media network or emergency response service.

The above-described position location systems typically work very well outdoors but encounter problems when the user is inside a building or other structure. To remedy this situation, a variety of indoor position location systems have been developed. Many of these systems use a wireless network, such as a standard network using an IEEE 802.11 wireless protocol, commonly referred to as Wireless LAN or Wi-Fi. These location systems often use multiple antennas or routers and determine a user's location utilizing various triangulation techniques involving the timing and or signal strength of multiple wireless signals. Despite the complexity of these systems, many suffer from reliability problems associated with signal blockage and or reflection problems created by obstacles located in the building. Other existing indoor systems that use Bluetooth or audible signals encounter similar drawbacks.

What is needed but not provided by the prior art are simple yet reliable systems and methods for determining the location of multiple users, particularly in an indoor setting.

BRIEF SUMMARY OF THE INVENTION

The present invention relates to systems and methods for allowing a mobile device user's location and or identity to be determined. According to one aspect of the disclosure, a method of creating a database comprises providing a first wireless router or device at a point of sale where a credit card is used in a transaction by a credit card holder, obtaining an identity of the credit card holder during the credit card transaction, establishing a wireless link between the first router or device and a mobile device carried by the credit card holder, obtaining a Media Access Control (MAC) address associated with the credit card holder's mobile device over the wireless link, correlating the identity of the credit card holder with the MAC address of the credit card holder, and storing the correlated identity and MAC address on a server.

According to other aspects of the disclosure, a cellular link may be established with the mobile device carried by the credit card holder and/or the cellular signals from the phone may be intercepted. These cellular interactions may be established at discrete locations with passive cellular signal interception equipment rather than active cellular service equipment operated by cellular carriers. A unique identifier, such as an International Mobile Subscriber Identity (IMSI), International Mobile station Equipment Identity (IMEI), or Temporary Mobile Subscriber Identity (TMSI), may be obtained from the cellular link, correlated with the identity of the credit card holder, and stored on a server.

In some embodiments, the invention may be a shelf based system used in in grocery stores, convenience stores, and by other retailers that will often be useful for brand awareness and outreach. The system may be configured to register customer phones (e.g. cell phones such as smartphones), either automatically, or optionally with customer participation, and store this registration data in a suitable database. To encourage customer participation in the registration process, customers can be rewarded or compensate by various methods, including coupons and the like. Participating (i.e. registered customers) can receive additional positive feedback for the process by, for example, being sent an automatic text message when the system automatically detects that the customer (actually the customer's cell phone or smartphone) is near a display or other designated point.

In some embodiments, may be a system to determine customer line length or the length of any line of people (e.g. queue), and to notify management and/or staff when additional personnel should be added to help process whatever function the customers or other people in the queue are waiting for. The invention may also provide management and staff with data regarding the queue for various types of standard and custom output, measurements, and aggregation purposes.

BRIEF DESCRIPTION OF THE DRAWINGS

FIG. 1 shows an embodiment of the invention used to collect customer data at a transaction point.

DETAILED DESCRIPTION OF THE INVENTION

The systems and methods disclosed herein allow the location of a smart phone user (particularly indoors) to be determined without the use of GPS, sound or triangulation. In some embodiments, the location may be determined without the use of cell phone signals. Novel uses of the location information are also disclosed. As used herein, the term "router" may be used to refer to a device that has traditional computer network router capabilities, or depending on the context, it may be used to refer to a proprietary device that is not constructed and does not function like a traditional router.

Search Beacon

According to one embodiment of this disclosure, a wireless router is used to determine whether a particular smart phone user is within a predetermined distance from the router. The router may make this determination by making a wireless connection with the smart phone and obtaining its MAC address (unique Media Access Control address). The router can determine that the smart phone is within the predetermined distance by measuring the strength of the signal from the smart phone (such as 80% or 100% signal strength). No Internet connection need be provided to the smart phone by the router. Only a single router is needed and no triangulation is performed. One example of an application using this technology is at a casino table. A wireless router may be installed underneath the table and determines how many players (having smart phones) are seated at the table and/or standing adjacent to it. The actual identities of the players may or may not be determined by the search beacon system depending on its configuration, but the duration of stay of the players at that particular table may be measured, and their travel to other locations within the casino may also be measured.

Banned Customer

The MAC address of a customer who has been banned from play at a casino may be determined automatically by a wireless router at the time that the customer is originally being detained. Wireless routers placed throughout the casino can then later alert management if that customer has returned to the casino or a part of the casino that he has been banned from.

Tracking Customer History

A customer's behavior may be tracked using his MAC address without knowing the customer's actual identity. For example, a store may determine that a customer associated with particular MAC address has purchased certain products before, and provide that customer with coupons or other product suggestions when that customer returns to the store. By way of another example, the playing history of a player at a casino may be tracked. This data may be used individually or in the aggregate with other players to take a variety of actions.

Loyalty Points

A customer's purchases and/or time spent in a store or playing at a casino may be tracked using a MAC address. A prize or other reward may be provided to the customer after certain milestones have been met. The customer's phone can be used instead of a physical card for the purposes of tracking play or identification.

Length or Speed of a Customer Line

The length or speed of a customer line can be determined by tracking the movement of a particular MAC address through the line. This can be accomplished by placing one or more wireless routers adjacent to the line. The signal strength received by the router and associated with a particular MAC address can be monitored. As the signal strength increases and then decreases, it can be determined that particular customer is passing by the router. By measuring the absolute signal strength or its change over time, the length and/or speed of the line can be known. The length of the line can also be measured by determining how many MAC addresses are connected with a particular router. Multiple routers can also be used to also determine the length of the line. The speed of the line can be determined by tracking MAC addresses as they are passed from one router to the next. Once the length or speed of a line is determined, management may be alerted and/or other actions taken, such as adding more cashiers or displaying a wait time to customers.

The parameters can additionally report on the average dwell time that various customers wait in a line, and the number of line exceptions—e.g. number of times customers or other individuals in the queue leave the queue, cut in line in the queue, are diverted from a first queue to a second queue, are left unsatisfied because the queue terminated before the customer was served, and the like.

MAC Addresses in a Vehicle

A wireless router may be placed next to a roadway, such as next to a drive through restaurant window or tollbooth. The router may then poll the MAC addresses adjacent to it at a particular time to determine how many occupants (having smart phones or devices that are turned on) are in the vehicle passing by. Each of these unique MAC addresses may be captured and stored for later use. For example, when one or more of these MAC addresses are later detected by the same wireless router or one at a different franchise location, the user(s) can be treated as return customers. In another embodiment, the above system may be used for violation monitoring of specially designated High Occupancy Vehicle (HOV) lanes. Such systems can indicate to authorities where and/or when to setup physical monitoring for ticketing/revenue generation if a vehicle's occupancy related to a MAC address is always reporting less than the HOV/requirement. This could also then initiate a high-speed camera to take a picture of the vehicle/license for electronic review/ticketing.

Correlation of MAC Address with Customer Identity

A router may be placed adjacent to a location where a customer's identity is determined, such as when the customer is checking into a hotel or registration desk, using a kiosk, paying a cashier using a credit card, or other point of sale or transaction location where demographic information is being collected. Depending on the context, the term "credit card" as used herein can refer to a traditional credit card, a debit or check card, an ATM or bank card, a driver's license, or other card which provides the identity of the customer. The MAC address of the customer's smart phone can be determined at this time and correlated to the customer's name, credit card number, or other identifying information such as a photo or video of the customer being concurrently taken. In other applications, the MAC address of a vehicle driver and/or passengers may be obtained as these occupants are exiting a vehicle. Information about the vehicle, such as a photo or license plate number may then be associated with one or more MAC addresses of the occupants.

To effectively place large numbers of wireless routers in locations where they may quickly reach the largest numbers of consumers, arrangements may be made with large vendors having many existing installations already in place across the country and the globe. For example, making a single arrangement with a company having kiosks already in place in most every mall across the US would allow routers to be strategically placed in areas having a high volume of customer traffic. By way of another example, a single arrangement may be made with an entity controlling airport newsstands across the US so that many routers can be quickly placed in multiple locations in every airport in order to gather large numbers of MAC addresses and correlate those addresses with customer identities.

Advertising Based on Consumer Location History

According to some embodiments of the present disclosure, a consumer's location history may be tracked by establishing wireless links with the consumer's mobile device with various routers at known locations and transmitting this information to a central server. Moreover, this "breadcrumb" history may be used to provide specific advertising to the particular consumer's mobile device based on the combination of locations the consumer has visited and or the duration of time spent at each location. The phone identifier is captured as 'breadcrumbs' or historical information. When the consumer's phone browser is launched or an application is loaded, the phone can display messages or ads that are related to the previous locations. For example, if the user visited a car dealership two days ago, ads for the dealership would appear on the phone. If the person visited a store or restaurant, coupons or other messages would be sent to the phone.

Bridge Advertising from the Mobile Device to the Desktop or Laptop Computer

According to other embodiments of the present disclosure, advertising may be provided to the consumer's desktop or laptop computer. As previously described, a MAC address or other unique identifier may be obtained from the consumer's mobile device, and the consumer's identity may be obtained during a transaction and associated with the unique identifier. Once the consumer's identity is known, advertising, coupons and/or other messaging may be directed not only to the consumer's wireless or cellular mobile device (such as a cell phone or tablet), but also to his or her desktop and or laptop, such as through a browser. The messaging may be customized to the particular consumer based on the location(s) that the consumer has visited with his or her mobile device.

Tradeshow Application

According to aspects of this implementation of the technology, the location of tradeshow attendees may be tracked. In one exemplary embodiment, the system and method include two main components: 1) a wireless router located at each tradeshow booth, table and/or at predetermined locations; and 2) a smartphone app that is downloaded to each attendee's smartphone prior to or upon entrance to the tradeshow.

The routers need not have internet connectivity. Their main purpose is to establish a brief wireless connection between the router and each attendee passing nearby. During this connection, the router supplies a unique code to the smartphone app so that the app then knows the location of the attendee (from the known location of each router). As the attendee moves about the tradeshow floor and establishes a connection with each wireless router he or she passes, various events can be triggered:

A) A map of the indoor tradeshow hall may be displayed on the smartphone showing the attendee his current location and/or path traveled.

B) Information about the adjacent booth can be displayed on the attendee's smartphone. This information may be transmitted across the wireless connection, may be downloaded through a cellular connection, or may have been previously downloaded with the tradeshow app.

C) Lead generation may be provided to the booth's vendor. In some cases, a log may be generated for each vendor providing the name, company, contact information, time and duration of visit, etc. for each attendee that visited the booth.

D) With a combination of B) and C) above, follow-up information, coupons, etc. may be automatically sent to the attendee.

E) A log of the booths visited may be provided to each attendee, with additional information about these vendors of interest.

During operation, the mobile device interrogates each router or "beacon". In some cases, http: can be used to request the location in a certain format and specific port number, and the router returns a specific code whose location has already identified.

The router continually checks to see if it is connected to the Internet by looking for google.com (or any other web site). If it is not present, the wireless signal is turned off and on (pulsed) for a predetermined time period. This is done to release the mobile device from the wireless network so that it does not try to communicate with a dead network. This may be an essential feature for the commercial use of the device. Additionally, a user's cell phone can interrogate each of the routers in an area to determine the signal strength that the phone is generating by analyzing the received power at the router. This data can then be stored on a central server, which can then be retrieved by the phone to locate the device on a map. The data can further be analyzed to determine a history of all devices that were detected.

In some embodiments information is transmitted directly between the beacon and the mobile device through the wireless link. In some embodiments information is transmitted indirectly through the cloud between the beacon and the mobile device.

In some embodiments, a registration process is used to synchronize a unique identifier associated with a mobile device and the user that device. The process may involve having the user place his mobile device upon a registration device so that the registration device can distinguish the unique identifier of the mobile device from other mobile devices in the area. The registration device may then display a number and direct the user to enter that number into the mobile device to complete the registration process.

Retailers

In other embodiments the system may be used to:

A) Identify customers shopping for high-value products so that a sales person can be sent to help them.

B) Track traffic counts of new and returning customers.

C) Automatically notify management when cashier lines become too long so that staff can be added.

D) Locate nearest employee to customer who needs help.

E) Upsell products to customer (accessories, etc.).

F) Store mapping to help customers find products.

G) Customer rewards for spending a particular amount of time or money in the store.

H) Notify store management when a customer is searching online for comparable products.

In some embodiments, wireless routers or beacons are placed on store shelves. When a customer passes within a predetermined distance of the beacon, information and or coupon(s) associated with the products that are adjacent to the beacon can be sent to the customer's mobile device. The information and/or coupons may be transmitted directly over the wireless link, or they may be transmitted to the mobile device through the cloud.

Restaurants

In other embodiments the system may be used to:

A) Identify customers' frequency of visits in order to issue time-value promotions.

B) Track traffic counts of new and returning customers.

C) Automatically notify management when cashier lines become too long so that staff can be added.

D) Allows customer to order and pay from phone, reducing lines and staffing.

E) Identify customers, place them on waiting lists and notify them when their table is available.

F) Upon entering a restaurant to pick up a takeout order, the cooks may be notified that the customer has arrived so that the food preparation can be completed or packaged.

G) Electronic signage can be utilized to welcome the customer and direct them to a specific line.

H) Automatically create coupons for users who are proximate to the restaurant's location(s).

Especially valuable to national chains such as fast food franchises wherein the customer identification system determines that a particular person has recently visited one of the chain's locations and is now located in proximity to another of the chain's locations.

I) Allows major branders who have advertising or other promotional relationships another opportunity to touch audiences with relevant promotions or to collect data otherwise not available to them.

Real Estate

In other embodiments, the system can allows room by room information of a property to be presented to a potential buyer or renter conducting a walk-through. For example, in commercial real estate, a potential lessee can be walking through a conference room of an available property and automatically establish a wireless link between his mobile device and a wireless begin located in the conference room. Pictures, text, audio and or video associated with that portion of the property may then be automatically sent to the mobile device.

For the purpose of determining pedestrian traffic counts in front of property for rent/lease/sale, a device may be placed by the door of the property and counts can be determined by hour and included as part of the property profile. In some embodiments, other information may be also be tracked such as average age, median income, etc.

Real estate brokerage firms, property management firms and developers may be provided with important data of visitors at residential and commercial sales/rental sites, providing them the ability to push messages back to those visitors.

Data about visits to properties for rent or for sale may be provided when sales people are not present.

Educational Institutions

In other embodiments the system may be used for:

A) Automatic attendance can be taken.

B) Daily lessons appear on students' mobile devices.

Hospitals

In other embodiments the system may be used to: track doctors and patients. Also, a patient's medical records may be automatically displayed on a doctor's iPad when the doctor enters the patient's room.

Seminar Compliance

In certain fields of endeavor, practitioners are required to take periodic training or educational courses. For example, in the practice of law, many states in the U.S. require attorneys to periodically take mandatory continuing legal education (MCLE) seminars. Often times, attendance is taken before or after such seminars. In some embodiments of the present disclosure, the systems and methods described herein can be used to ensure compliance. For example, the inventive location tracking systems can be used to confirm that particular attorneys seeking MCLE credit remained in a particular location or locations for the prescribed amount of time. Such systems can be particularly advantageous during all day or multiple-day seminars in which multiple instructional presentations are occurring, sometimes simultaneously.

Fast-Food Restaurants

A wireless router or routers (or other wireless device) may be placed in the drive-through lane, such as at the existing speaker location, and/or at the inside counter of a fast food restaurant. An application located on a customer's mobile device may be configured to allow the customer to select the items he wishes to order. This may be accomplished with text, photos, check boxes, voice recognition or a combination thereof. As the mobile device comes within a predetermined distance of the wireless router, a wireless link is created and the customer's order is automatically placed. This pre-ordering arrangement can significantly reduce errors, lines and increase throughput.

In some embodiments, the mobile device receives a unique identifier from the wireless router, which prompts the mobile device to transmit the food order from the mobile device to the restaurant, either through a cellular network, the cloud and/or directly through the wireless link.

In some embodiments, a user's previous orders or favorites can be stored on the mobile device so that the information does not have to be reentered each time it is ordered.

Scavenger Hunts

Various aspects of the tracking technology disclosed herein may be used to conduct "scavenger hunt" type events. For example, as part of a marketing campaign, various stores within a mall, exhibitors within an exhibition hall or tradeshow, or other entities within a particular region can coordinate to conduct an event whereby participants are rewarded with prizes for visiting a certain number of the stores and/or spending a predetermined amount of time in each store, booth or specific location. In one embodiment, one or more beacons may be located in each of the participating stores. As a particular participant passes by each beacon, and wireless link may be established. A unique identifier for each beacon can then be sent to the mobile device and/or a central server. Alternatively, a unique identifier for each mobile device can be collected by each beacon it passes and then sent to a central server. The amount of time spent by a participant adjacent to a particular beacon may be recorded and transmitted along with the unique identifier, or the system may wait until the predetermined amount of time has elapsed before sending the unique identifier. In some embodiments, the order in which the participant must visit each store is prescribed.

In a related embodiment, movement of participants or other consumers traveling through a mall may be tracked. For example, a beacon can be placed adjacent to doorways leading between an anchor tenant and the rest of the mall. With this arrangement, the mall management can determine how many people enter the mall from an anchor tenant's store. With additional beacons located throughout the mall, the traffic patterns of shoppers can be anonymously tracked in aggregate. In some embodiments a mall application is loaded on the shopper's mobile devices, allowing the travel patterns of individual shoppers to be tracked rather than tracking shoppers in aggregate.

Many other uses for the indoor position tracking technology disclosed herein may naturally be employed.

Details of Exemplary Hardware and Software

In one exemplary embodiment of the present disclosure, a portable battery powered wireless router or routers may be used. For example, a model number TL-MR3020 router provided by TP-Link® of Shenzhen, P. R. China, may be used. This router is compact in size and may be powered through its USB port. In some embodiments, the router may be used in a standalone mode during operation, connected to a laptop or desktop computer, or connected with a 3G/4G USB modem to create a wireless Internet connection for the mobile wireless device over a cellular network. A wired or wireless connection may also be provided between the router and a server.

Various sets of software tools may be used in conjunction with the wireless router to establish wireless links between the router and mobile devices such as smart phones, and to obtain the unique identifiers from the mobile devices. In some embodiments, one or more freeware programs may be downloaded, modified and installed over the router's standard firmware. For example, an 802.11 WEP program may be obtained online and used for packet capturing of raw 802.11 frames. Such software may be particularly useful for collecting WEP IVs (Initialization Vectors). By way of one non-limiting example, www.aircrack-ng.org provides documentation for obtaining, modifying, compiling, using and troubleshooting suitable software programs.

In any of the embodiments described above, the wireless link may be replaced with a cellular link and/or passive interception of cellular signals from consumer's cell phones. A cellular link may be established with the mobile device carried by the credit card holder and/or the cellular signals from the phone may be intercepted. These cellular interactions may be established at discrete locations with passive cellular signal interception equipment rather than active cellular service equipment operated by cellular carriers. A unique identifier, such as an International Mobile Subscriber Identity (IMSI), International Mobile station Equipment Identity (IMEI), or Temporary Mobile Subscriber Identity (TMSI), may be obtained from the cellular link, correlated with the identity of the credit card holder, and stored on a server. Examples of cellular scanning or intercepting equipment that may be used in some embodiments are provided by ABILITY Computers & Software Industries Ltd, Tel Aviv Israel.

In many of the embodiments described above, the wireless 802.11 link may be replaced with a Bluetooth link. For example, in some embodiments the wireless router is replaced with a battery-powered, disc-shaped Bluetooth device. In a similar manner to the embodiments described above, the Bluetooth device may automatically establish a link with a user's mobile device as that mobile device comes within close proximity of the Bluetooth device. In some embodiments, the Bluetooth device will acquire a unique identifier from the mobile device, similar to the MAC address described above. In these embodiments, since the location of the Bluetooth device is known, the approximate location of the mobile device is also known. A signal strength of the link between the Bluetooth device and the mobile device can also be used to further refine the location of the mobile device. The mobile device ID and location may then be transmitted from the Bluetooth device to a computer network, such as through a USB connection, and or transmitted to the mobile device through the computer network or directly through the Bluetooth link. In other embodiments, the mobile device may acquire a unique identifier from the Bluetooth device, allowing the location of the mobile device to be transmitted to a computer or cellular network, and or to the Bluetooth device through the computer or cellular network or directly through the Bluetooth link. An application running on the mobile device may also utilize this location data for various purposes.

One advantage of using a Bluetooth link with a mobile device rather than an 802.11 wireless link is that information can be exchanged between the mobile device and the Bluetooth device without disrupting a wireless link that may already exist between the mobile device and a wireless network. As Bluetooth and other wireless communication protocols continue to evolve, the concepts disclosed herein may naturally be used with new protocols that have yet to be developed.

In many of the embodiments described above, the wireless 802.11 link may be replaced with a radio frequency identification (RFID) link. For example, in some embodiments the wireless router is replaced with a battery-powered, disc-shaped RFID device. In a similar manner to the embodiments described above, the RFID device may automatically establish a link with a user's mobile device as that mobile device comes within close proximity of the RFID device. In some embodiments, the RFID device will acquire a unique identifier from the mobile device, similar to the MAC address described above. In these embodiments, since the location of the RFID device is known, the approximate location of the mobile device is also known. A signal strength of the link between the RFID device and the mobile device can also be used to further refine the location of the mobile device. The mobile device ID and location may then be transmitted from the RFID device to a computer network, such as through a USB connection, and or transmitted to the mobile device through the computer network or directly through the RFID link. In other embodiments, the mobile device may acquire a unique identifier from the RFID device, allowing the location of the mobile device to be transmitted to a computer or cellular network, and or to the RFID device through the computer or cellular network or directly through the RFID link. An application running on the mobile device may also utilize this location data for various purposes.

One advantage of using a RFID link with a mobile device rather than an 802.11 wireless link is that information can be exchanged between the mobile device and the RFID device without disrupting a wireless link that may already exist between the mobile device and a wireless network. As RFID and other wireless communication protocols continue to evolve, the concepts disclosed herein may naturally be used with new protocols that have yet to be developed.

FIG. 1 shows an embodiment of the invention used to collect customer data at a transaction point.

In this example, customers in an indoor venue are tracked by their mobile devices (e.g. smartphones and the like). The system may implement mobile device interaction with search beacons by querying a customer mobile device for MAC address or cellular identifier search, and obtain the customer's MAC address or cellular identifier. Alternatively or additionally, often on a one-time event per customer basis, the system may obtain a unique customer identifier such as the customer's telephone number or Driver's license number. Often the unique customer identifier will be obtained at a transaction point. Once this data is obtained, then often by using a cellular or WiFi network or other networking means, the system will store the customer's MAC address or cellular identifier, often along with the customer identifier and the customer location, in a customer activity database. This database will thus store the customer's MAC address, cellular identifier, customer identifier, and the location(s) at which this data is collected.

The system can then analyze this database and as needed and desire produce various management alerts. The system can also respond to database queries and report on customer activity as desired.

Incorporation by reference: all publications, patent applications and web pages mentioned in either this specification, or in applications 61/831,111 and 61/915,449 are herein incorporated by reference to the same extent as if each individual reference was specifically and individually indicated to be incorporated by reference.

The invention claimed is:

1. A method of tracking a first mobile device, comprising:
providing a first wireless router at a first location;
establishing a first wireless link between the first wireless router and the first mobile device;
obtaining a unique identifier of the first mobile device;
transmitting the unique identifier of the first mobile device from the first wireless router to a central server; and
providing data to the first mobile device when the first mobile device is at a location other than the first location, the data based on the first mobile device having previously been located at the first location;
correlating the unique identifier of the first mobile device with an identity of a user of the first mobile device wherein the unique identifier of the first mobile device is a credit card used as payment for a transaction at the first location.

2. The method of claim 1, further comprising:
providing a second wireless router at a second location;
establishing a second wireless link between the second wireless router and a second mobile device; and
obtaining a unique identifier of the second mobile device.

3. The method of claim 2, further comprising:
correlating the unique identifier of the first mobile device with an identity of a user of the first mobile device.

4. The method of claim 3, wherein the correlating is performed by correlating the unique identifier of the first mobile device with a credit card used as payment for a transaction at the first location.

5. The method of claim 3, wherein the correlating is performed by correlating the unique identifier of the first mobile device with a license plate number of a vehicle of the user of the first mobile device, as identified in a photograph taken of the vehicle at the first location.

6. The method of claim 3, further comprising:
correlating a unique identifier of a second mobile device with the identity of the user of the first mobile device; and
providing data to both the first mobile device and the second mobile device, when the first mobile device is at a location other than the first location, the data based on the first mobile device having previously been located at the first location.

7. The method of claim 3, further comprising providing data to the first mobile device when the first mobile device is at a location other than the first location, the data based on the first mobile device having previously been located at the first location.

8. The method of claim 2, further comprising:
storing the unique identifier of the first mobile device at a central server.

9. The method of claim 2, further comprising:
determining a signal strength of the first wireless link between the first mobile device and the first wireless router; and
locating the first mobile device on a map based on the signal strength and the first location.

10. The method of claim 2, further comprising:
determining a signal strength of the first wireless link between the first mobile device and the first wireless router;
determining a signal strength of a wireless link between the first mobile device and a second router located at a second location; and
locating the first mobile device on a map based on the signal strength of the first wireless link between the first mobile device and the first wireless router, the signal strength of the first wireless link between the first mobile device and the second wireless router, the first location, and the second location.

11. The method of claim 10, further comprising displaying the map in a graphical user interface.

12. The method of claim 1, further comprising:
transmitting the unique identifier of the first mobile device from the first wireless router to a central server;
providing a second wireless router at a second location;
establishing a second wireless link between the second wireless router and a second mobile device;
obtaining a unique identifier of the second mobile device; and
transmitting the unique identifier of the second mobile device from the first wireless router to a central server.

13. The method of claim 1, wherein the correlating is performed by correlating the unique identifier of the first mobile device with a license plate number of a vehicle of the user of the first mobile device, as identified in a photograph taken of the vehicle at the first location.

14. The method of claim 1, further comprising: correlating a unique identifier of a second mobile device with the identity of the user of the first mobile device; and providing data to both the first mobile device and the second mobile device, when the first mobile device is at a location other than the first location, the data based on the first mobile device having previously been located at the first location.

15. The method of claim 1, further comprising:
storing the unique identifier of the first mobile device at a central server.

16. The method of claim 1, further comprising:
determining a signal strength of the first wireless link between the first mobile device and the first wireless router; and
locating the first mobile device on a map based on the signal strength and the first location.

17. The method of claim 1, further comprising:
determining a signal strength of the first wireless link between the first mobile device and the first wireless router;
determining a signal strength of a wireless link between the first mobile device and a second router located at a second location; and
locating the first mobile device on a map based on the signal strength of the first wireless link between the first mobile device and the first wireless router, the signal strength of the first wireless link between the first mobile device and the second wireless router, the first location, and the second location.

* * * * *